United States Patent
Geary

[19]

[11] Patent Number: 6,085,766

[45] Date of Patent: Jul. 11, 2000

[54] GEARY CONVERTIBLE CRUTCH SYSTEM

[76] Inventor: John A. Geary, 47 Seaview Ter. #D, Santa Monica, Calif. 90401

[21] Appl. No.: 09/161,159

[22] Filed: Sep. 25, 1998

[51] Int. Cl.[7] ......................................................... A45B 9/00
[52] U.S. Cl. ................................. 135/75; 135/68; 135/71; 135/78
[58] Field of Search ........................... 135/66–69, 71–73, 135/75–78

[56] References Cited

U.S. PATENT DOCUMENTS

| | | |
|---|---|---|
| 2,630,128 | 3/1953 | Slater . |
| 3,492,999 | 2/1970 | Boyd . |
| 3,768,495 | 10/1973 | Smith . |
| 4,237,915 | 12/1980 | Zabielski . |
| 4,253,478 | 3/1981 | Husa . |
| 4,509,741 | 4/1985 | Smith . |
| 4,809,725 | 3/1989 | Champigny . |
| 4,917,126 | 4/1990 | Ellmore . |
| 5,139,040 | 8/1992 | Kelly . |
| 5,149,092 | 9/1992 | Parsons . |
| 5,402,811 | 4/1995 | Weng . |
| 5,482,070 | 1/1996 | Kelly . |
| 5,482,071 | 1/1996 | Liu . |
| 5,771,910 | 6/1998 | Kluttz . |
| 5,778,914 | 7/1998 | Trani .................................................. 135/66 |
| 5,806,548 | 9/1998 | Goldstein .......................................... 135/66 |

*Primary Examiner*—Beth A. Aubrey

[57] ABSTRACT

A compacting, adjustable walking aid comprising a shaft (20) made up of three rigid tubular members (22, 23, 24) arranged in telescopic fashion adjustably connected to one another by spring-loaded push button release pins (25) in cooperation with apertures in the tubes. A readily removable underarm support (30) secured by a release pin (25A) caps the upper shaft tube (22). A readily removable crutch handle (32), secured by a hand operated release assembly (32C), extends perpendicularly from a designated portion of the upper tubular member (22). This invention may be readily compacted telescopically to approximately one third of its extended length. By removing the upper shaft tube (22), and capping the middle shaft tube (23) with the appropriate attachment, this invention may be readily converted from a full-sized crutch to a forearm crutch (46), or a cane (48). Shock absorbing end tip (34) may be replaced with a quad tip attachment (50) transforming the cane to a quad cane. The utilization of push button release pins on all three shaft tubes, coupled with apertures on the interchangeable attachments, allow this invention to be transfigured into innumerable variations. When not in use as a walking aid, this invention may be converted to a multipurpose tool with any number of household, survival, and recreational uses.

14 Claims, 6 Drawing Sheets

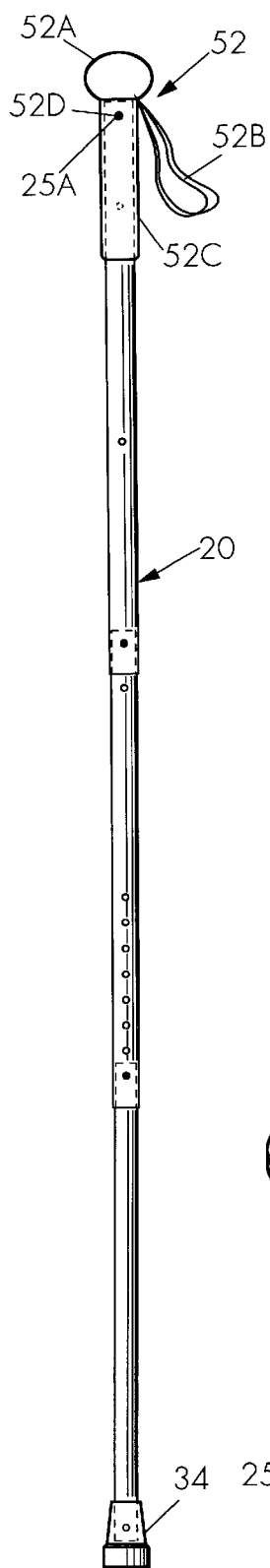
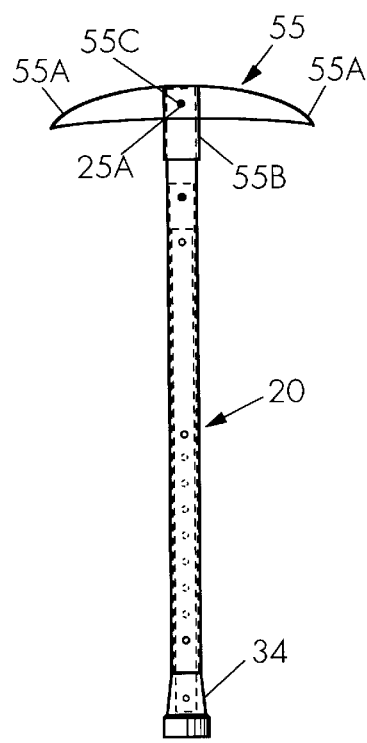
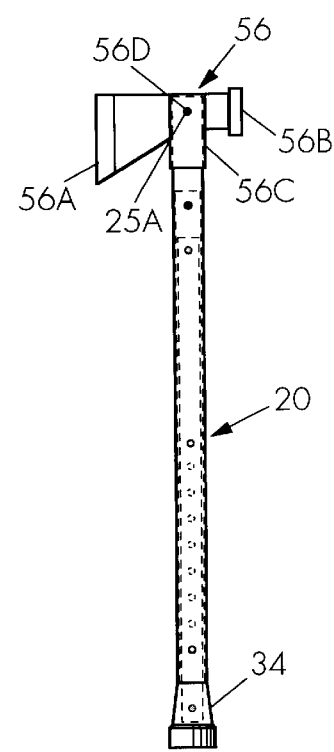
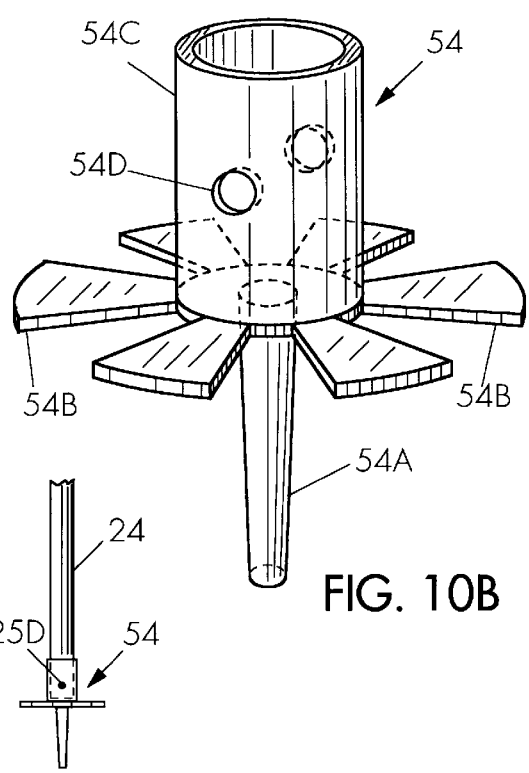
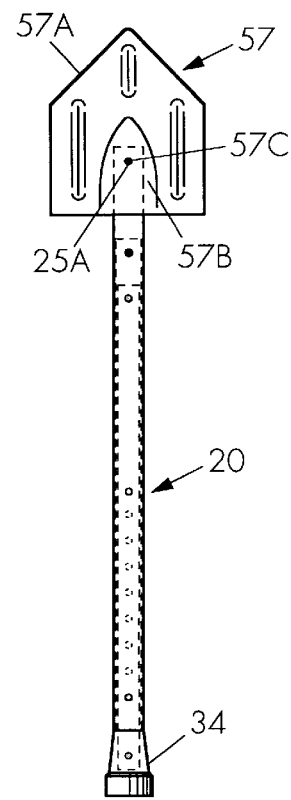
FIG. 9  FIG. 10A  FIG. 10B  FIG. 11  FIG. 12  FIG. 13

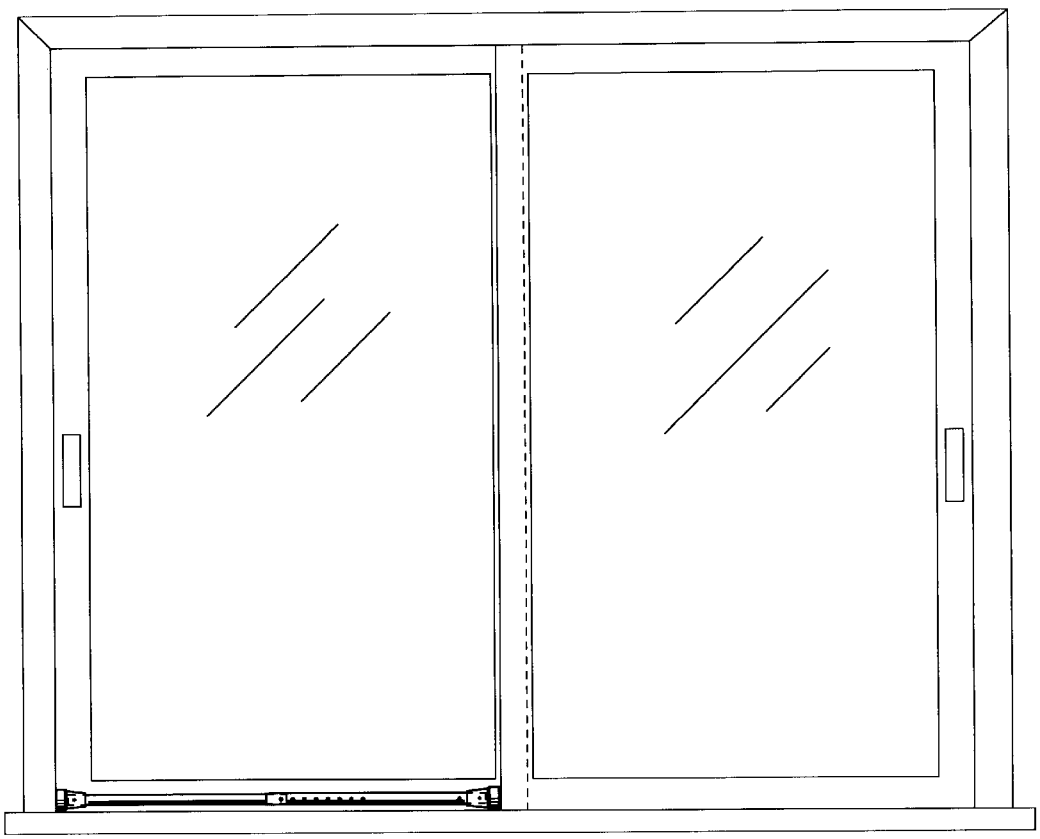
FIG. 16A
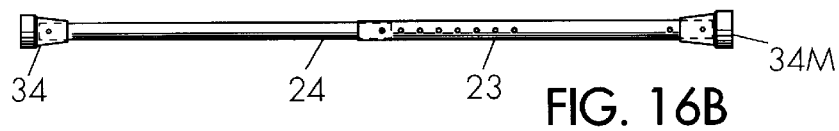
34  24  23  FIG. 16B  34M
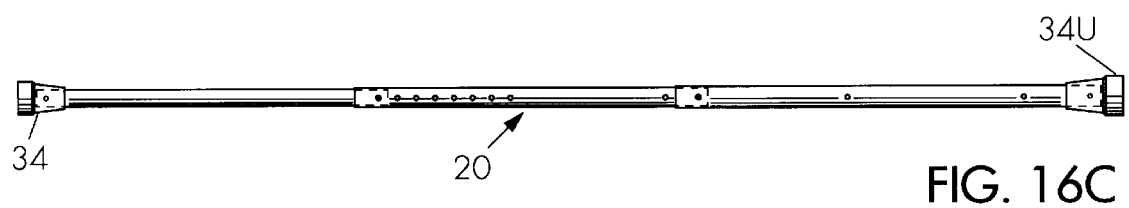
34  20  FIG. 16C  34U
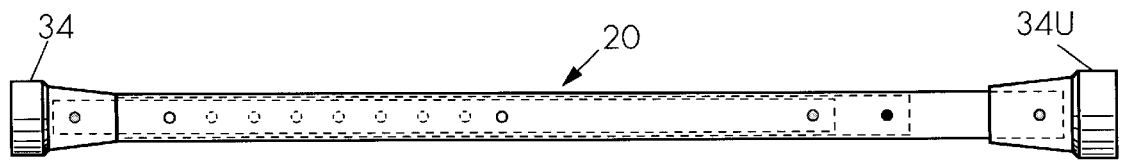
34  20  34U  FIG. 16D

GEARY CONVERTIBLE CRUTCH SYSTEM

FIELD OF INVENTION

This invention relates to devices such as crutches and canes used as walking aids for people, in particular, walking aids with multiple functions.

BACKGROUND OF INVENTION

The need for walking aids has lead to many embodiments of crutches, canes, and walking sticks. Older wooden crutches have been translated into aluminum, making them lighter, stronger, and more durable. The common ("Y"-shaped) aluminum crutch, U.S. Pat. No. 4,509,741 to Smith (1985), however has some major drawbacks. One problem with this design is stowability. When traveling in a car or sitting down at a restaurant these crutches are cumbersome, often creating a burden for others who have to find a place to set them. Comfort is also compromised as these crutches are rigid, allowing for only one hand position in relation to the under-arm support, which itself is uncomfortable. These crutches are limited to one embodiment only, full length under-arm walking aids. Thus, they are useless in any other situation, which may explain why these crutches are commonly found in thrift stores and garage sales.

Thereafter, inventors created several types of crutches which compact when not in use. U.S. Pat. No. 4,917,126 to Ellmore (1990) discloses a crutch with two parallel linear elements, each with adjustable appendages. However, this crutch contains more raw materials than necessary, resulting in excessive weight and cost. U.S. Pat. No. 4,253,478 to Husa (1981) discloses a crutch with a three segmented lower leg which folds in half. This crutch is unnecessarily complex, expensive to make, and potentially unsafe. Other folding crutches such as U.S. Pat. No. 3,492,999 to Boyd (1970) U.S. Pat. No. 4,237,915 to Zabielski (1980), and U.S. Pat. No. 5,402,811 to Weng (1995) fail to realize the potential for further simplicity and compactness.

Crutches which compact telescopically include U.S. Pat. No. 2,630,128 to Slater (1953), U.S. Pat. No. 3,768,495 to Smith (1973), U.S. Pat. No. 4,809,725 to Champigny (1989), and U.S. Pat. No. 5,139,040 (1992) and U.S. Pat. No. 5,482,070 (1996), both to Kelly. Each of these crutches fails to reach its potential efficiency due to excessive size, weight, complexity, expense to produce, or oversights in safety.

Crutches which convert to canes; U.S. Pat. No. 2,590,607 to Grimball (1952), and U.S. Pat. No. 2,960,095 to Smith (1960) are compromised when in the cane position, both visually awkward and overly complex. U.S. Pat. No. 5,482,070, to Kelly (1996) contains the following shortcomings: The underarm support is positioned in an awkward and uncomfortable relation to the handle. Kelly's crutch is unnecessarily bulky at the bottom with its end member being an unusual proportion which is not able to accommodate a standard crutch tip. When converted to a cane, the handle requires a plug to be inserted to cap the open tube. The handle is awkward, keeping the weight of the user away from the axis of support. Kelly's crutch, in its compacted state, is neither illustrated in the drawings nor described in the text All of the crutches heretofore known suffer from a number of disadvantages and shortcomings:

(a) None of the heretofore known crutches can adjust to comfortably accommodate persons of a 16 inch range of heights.

(b) None of the heretofore known crutches can compact to about one third of their extended height (c) None of the heretofore known crutches have fully adjustable, non incremental handles which may be freely positioned at any angle in relation to the crutch head.

(d) None of the heretofore known crutches convert to a forearm crutch, cane, and quad tip cane.

(e) Heretofore known crutches must employ a number of various pieces of hardware to assemble.

(f) None of the heretofore known crutches can be assembled entirely by hand using no tools.

(g) None of the heretofore known crutches convert to a multipurpose tool versatile enough to have uses in other areas such as camping, photography, and house-hold chores.

OBJECTS AND ADVANTAGES OF INVENTION

Accordingly, several advantages of the present invention are:

(a) to provide a crutch which accommodates persons of a broad range of heights, providing a large and a small setting, each with a range of sizes;

(b) to provide a crutch which can compact to about one third of its extended height thus making it easier to store and tote than previous crutch designs;

(c) to provide a crutch with a handle which can be quickly set to a variety of positions in relation to the crutch head allowing the user to find the most comfortable position and adjust at will;

(d) to provide a crutch which can be readily transformed to an adjustable forearm crutch, cane, or quad tip cane to aid walking in various stages of rehabilitation;

(e) to provide a crutch which uses push-button-release-pins throughout to allow the user to easily see, feel, and hear when coupled parts have securely engaged, insuring safe operation. Release pins are lightweight, inexpensive, and readily available and allow adjustments to be made by simply pushing the buttons and urging various parts on and off;

(f) to provide a crutch which requires no tools for assembly or operation, allowing assembly to be done quickly and easily, entirely by hand;

(g) to provide a crutch which, when not in use as a walking aid, can be converted any number of devices, including but not limited to a hiking staff, camping shovel, axhammer, unipod, or an all-purpose extension pole, with innumerable possibilities;

(h) to provide a crutch which can be of particular importance for survivalists, the military, emergency rescue units, or anyone requiring a highly portable, reliable, multipurpose tool;

(i) to provide a crutch which is simple in its design, requiring a minimum of steps in manufacture, less raw material, and less hardware than other crutches, making it less expensive to produce, while cutting energy consumption and waste and therefore benefiting the environment;

(j) to provide a crutch with a telescoping shaft, providing easier storage while cutting down on shipping expenses and retail shelf space.

We can see that this invention reduces costs in manufacture, storage, distribution, and display while benefiting the public by providing a more practical walking aid.

One which is comfortable, compact, reliable, light-weight, versatile, and economical.

Further objects and advantages of this crutch will become apparent from a consideration of the drawings and ensuing description.

BRIEF DESCRIPTION OF DRAWINGS

FIG. 9 is an elevational view of an embodiment of a hiking staff attachment in relation to a fully extended shaft.

FIG. 10A is an elevational partial view of an embodiment of a snow end tip attachment in relation to the extended hiking staff.

FIG. 10B is a perspective view of an embodiment of a snow end tip attachment.

FIG. 11 is an elevational side view of an embodiment of a pick attachment as it relates to the compacted shaft.

FIG. 12 is an elevational side view of an embodiment of an ax-hammer attachment as it relates to the compacted shaft.

FIG. 13 is an elevational front view of an embodiment of a shovel attachment as it relates to the compacted shaft.

FIG. 16A is an elevational view of an embodiment of a two segment pole as it may be used as a door block (shown with sliding doors).

FIG. 16B is a horizontal side view of a two segment pole with a middle tube abutment tip.

FIG. 16C is a horizontal side view of the three segment pole with an embodiment of a top tube abutment tip.

FIG. 16D is a horizontal side view of the compacted shaft baton as shown with the top tube abutment tip.

SUMMARY

This invention is an adjustable, compacting, multipurpose walking aid which, through the utilization of a simple release means, and interchangeable attachments, can be readily converted from a crutch to a forearm crutch, cane, or a quad tip cane as desired. By changing attachments this invention can be readily converted to a multipurpose tool with any number of household, survival, and recreational uses.

Figure 1A:
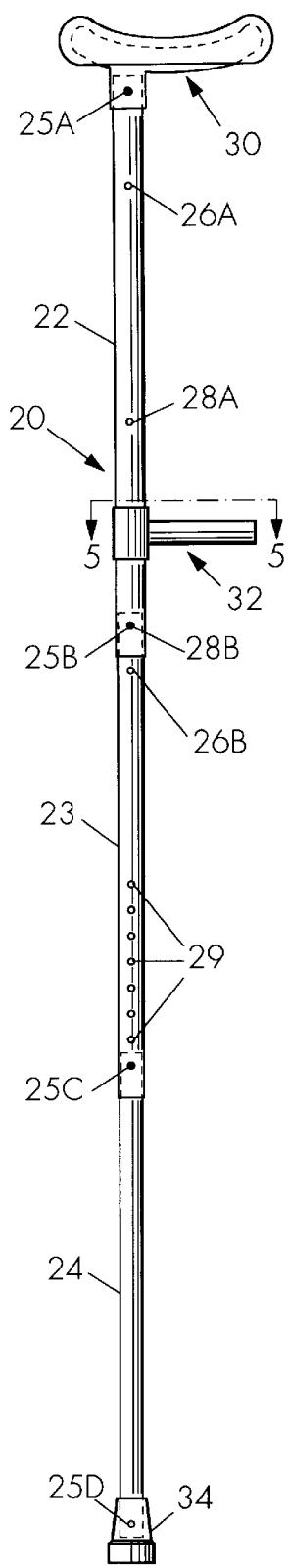
FIG. 1A is an elevational side view of an embodiment of a fully extended crutch.
Figure 1B:
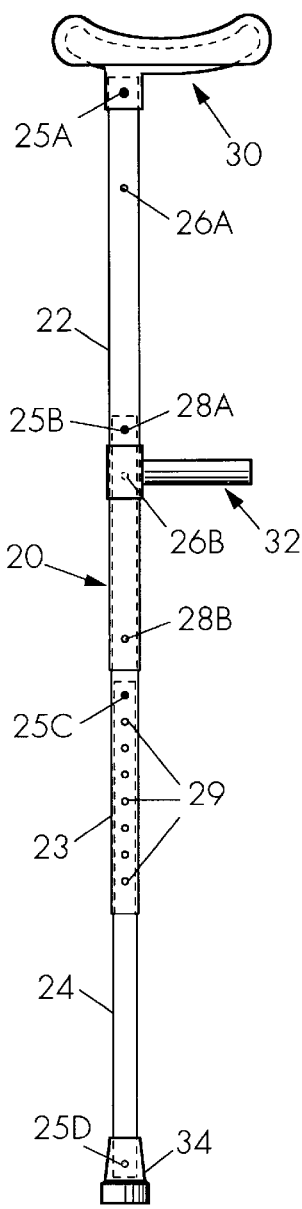
FIG. 1B is an elevational side view of an embodiment of the crutch set to its smallest size.
Figure 1C:
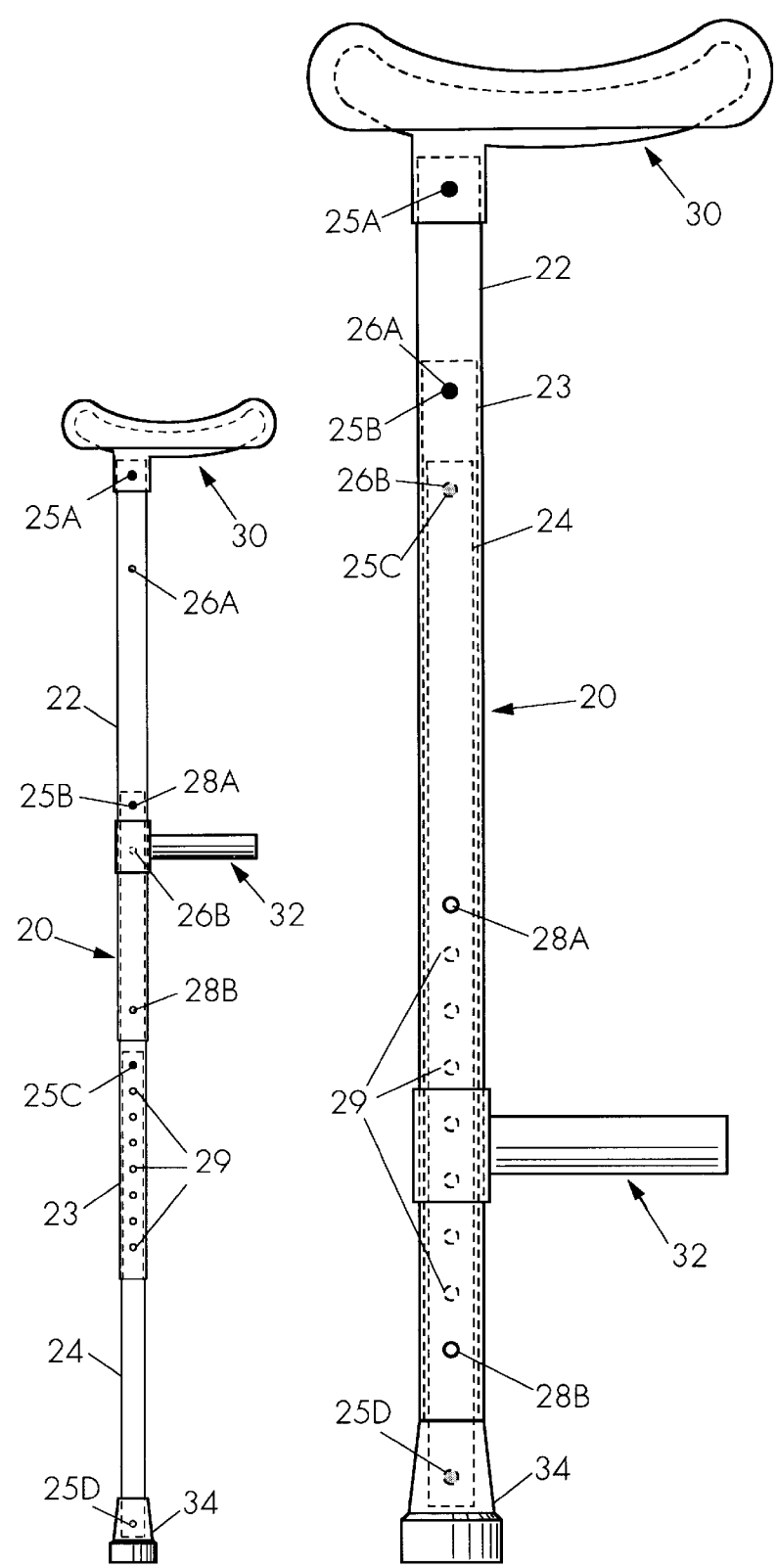
FIG. 1C is an elevational side view of the crutch in its compacted position.

Description and Operation—FIGS. 1A, 1B, 1C

Referring now to FIG. 1A, there is shown a fully extended crutch. The primary structure of this invention is a shaft 20 comprising three telescoping members the upper 22, middle 23, and lower 24 shaft tubes respectively. The shaft tubes are made of a high-strength, lightweight material such as aluminum. Upper shaft tube 22 receives middle shaft tube 23, and middle shaft tube 23 receives lower shaft tube 24. The shaft tubes are connected by spring-loaded release pins or "bullet pins" 25 which engage release pin holes or "bullet holes" located in opposing pairs at various positions on the shaft.

Figure 5:
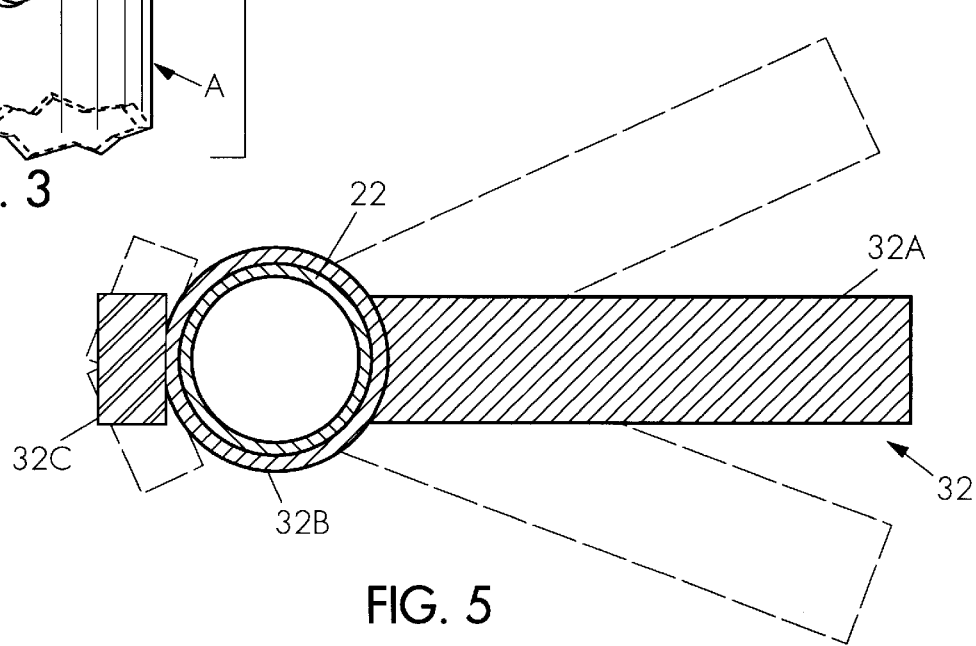
FIG. 5 is a top, sectional view of an embodiment of a crutch handle attachment and how it attaches to the shaft.

Starting at the top, we see an underarm support attachment 30 (see FIG. 2). this piece is held in place by upper release pin 25A. Moving down the upper shaft tube we see upper nesting hole 26A Several inches down we see short extension hole 28A and at the bottom of the upper shaft tube 22 we find long extension hole 28B. A crutch handle assembly 32 (see FIG. 5) is adjustably attached between the short and long ext. holes 28A and 28B respectively.

Referring still to FIG. 1A we see mid. release pin 25B engaged with long ext. hole 28B. Just below we find lower nesting hole 26B near the top of the mid. shaft tube 23. Several inches below we see eight incremental extension holes 29, spaced at one inch intervals. A lower top release pin 25C located near the top of lower shaft tube 24, is seen in FIGS. 1A, 1B and 1C engaged with the lowermost incremental ext hole 29. Moving down the lower shaft tube 24 we see at the bottom a crutch end tip 34. Concealed beneath end tip 34 we see lower bottom release pin 25D.

Referring now to FIG. 1B there is shown the extended crutch in its smallest position. In this position middle release pin 25B mates with short extension hole 28A, moving middle shaft tube 23 further into upper shaft tube 22. Lower top release pin 25C mates with uppermost incremental extension hole 29, moving lower shaft tube 24 further into middle shaft tube 23 shortening the shaft.

Referring now to FIG. 1C there is shown the fully compacted crutch. In this position lower shaft tube 24 resides within middle shaft tube 23 being held in place by the engagement of lower top release pin 25C and lower nesting hole 26B. Middle shaft tube 23 resides within upper shaft tube 22 being held in place by the engagement of middle release pin 25B and upper nesting hole 26A In this position the shaft is roughly one third the length of the fully extended crutch.

Operation—All FIGS.

All embodiments of this invention operate by compressing the release pins 25 and simultaneously sliding any two parts together or apart until they engage the desired hole, or are removed. This is the method used to compact, extend, or disassemble the shaft and also secure or remove any attachments (except handle 32, see FIG. 5). This invention allows attachments to be secured in the same manner to any of the three tubular shaft members 22,23, and 24.

Description and Operation—FIGS. 2, 3, 4A, 4B, 5

Figure 2:
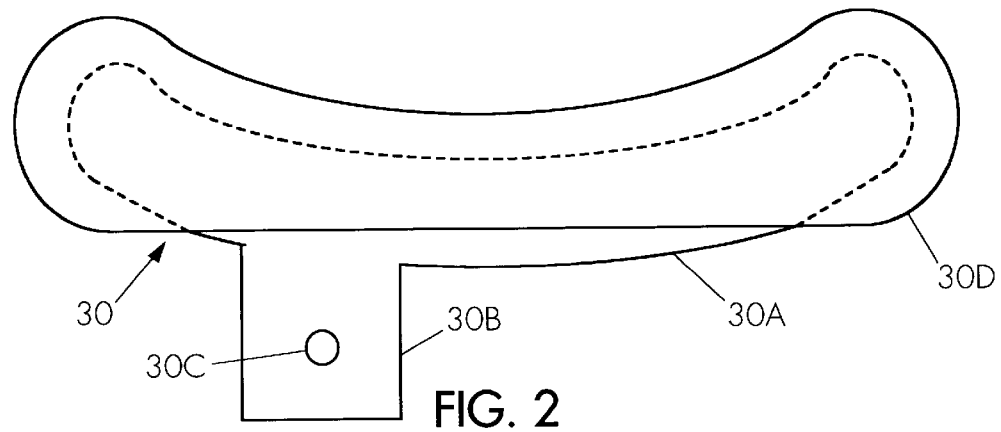
FIG. 2 is a side view of an embodiment of an underarm support.

Referring now to FIG. 2 there is shown a side view of an underarm support assembly 30. We see an underarm support bar 30A shown covered by a support pad 30D. Protruding from the underside of support bar 30A we see a collar 30B which fits over upper shaft tube 22 (not shown). Pin hole 30C resides on the side of collar 30B to accommodate upper release pin 25A (not shown), operably securing underarm support assembly 30 to the shaft (not shown).

Figure 3:
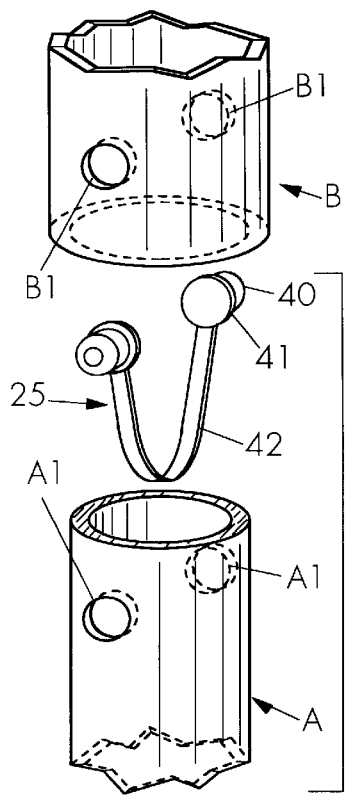
FIG. 3 is an exploded perspective view showing a spring-loaded release pin and how it acts to secure two parts.

Referring now to FIG. 3 there is shown an exploded perspective view of a release pin assembly 25 and how it acts to secure two parts A and B. This figure applies to the structure and operation of all release pins contained within this invention. We see pictured a release pin 25 comprising a pair of diametrically opposed pin heads 40. Each pin head includes a limit flange 41 at the base of the pin head which is larger in diameter than housing hole A1, keeping release pin 25 contained within the given tube. The pin heads 40 are held in place by a resilient portion or spring 42 which applies steady pressure to opposing sides, holding said pin 25 in place within said housing hole A1. Any part to be attached B fits over its correlating shaft tube A, allowing pin hole B1 to mate with release pin 25.

Figure 4A:
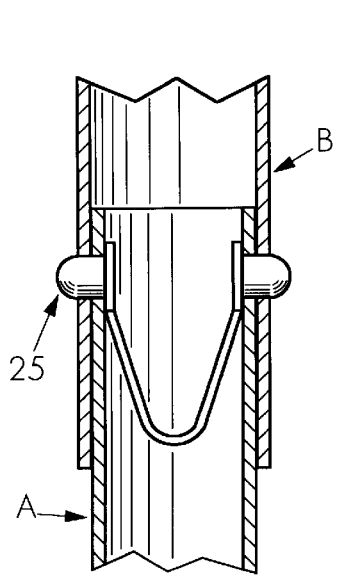
FIG. 4A is a sectional view diagram showing how a release pin secures two shaft segments.

Referring now to FIG. 4A there is shown a sectional diagram showing a release pin assembly 25, and how it acts to secure two parts. This figure applies to the structure and operation of all release pins contained within this invention. We see pictured a release pin assembly 25 as it acts to secure any shaft tube A, to a part to be attached B.

Figure 4B:
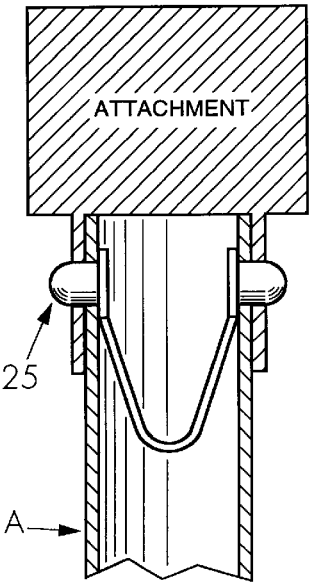
FIG. 4B is a sectional view diagram showing how any attachment may be secured to any of the shaft segments.

Referring now to FIG. 4B there is shown a sectional diagram showing a release pin assembly 25, and how it acts to secure said parts. This figure applies to the structure and operation of all release pins contained within this invention. We see pictured a release pin assembly 25 as it acts to secure any shaft tube A, to any attachment Referring now to FIG. 5 we see a top sectional view of a crutch handle assembly 32, as it relates to upper shaft tube 22. Handle bar 32A extends from collar 32B which encircles upper shaft tube 22. Collar 32B is operably secured to upper shaft tube 22 by a hand operated release assembly 32C selected from the group consisting of hand operated release mechanisms. Handle 32 may be set at any angle relative to the underarm support 30, in rotation around the shaft 20.

Figure 6:
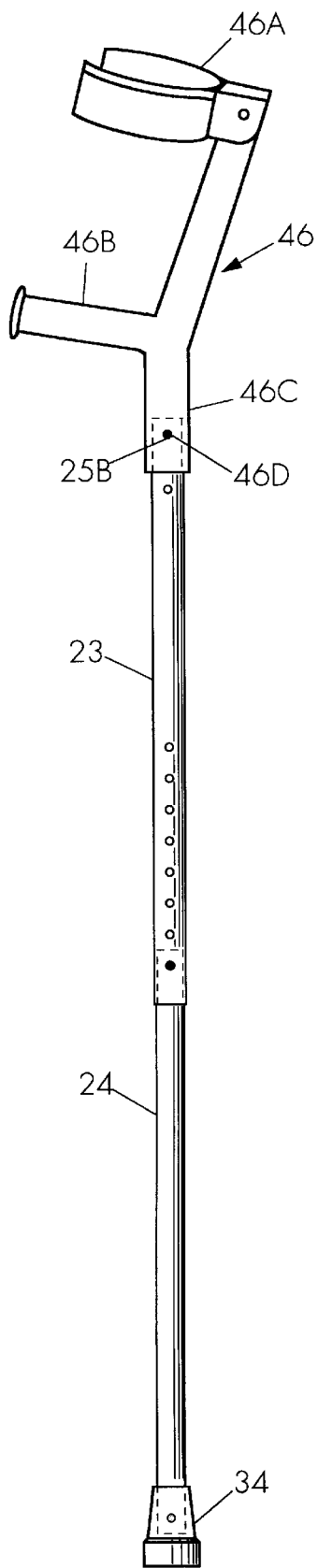
FIG. 6 is an elevational side view of an embodiment of a forearm-crutch attachment in relation to a shortened, two segment, shaft.
Figure 7:
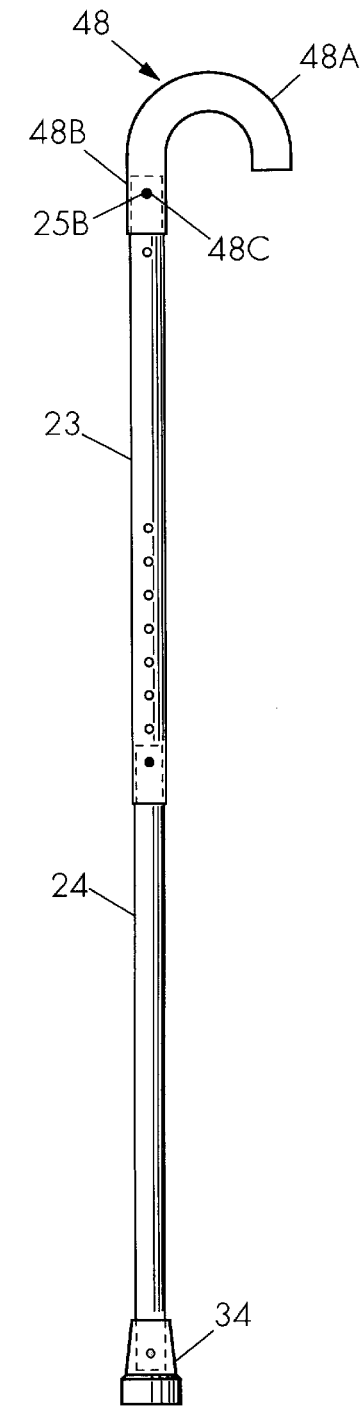
FIG. 7 is an elevational side view of an embodiment of a cane attachment in relation to a shortened, two segment, shaft.
Figure 8:
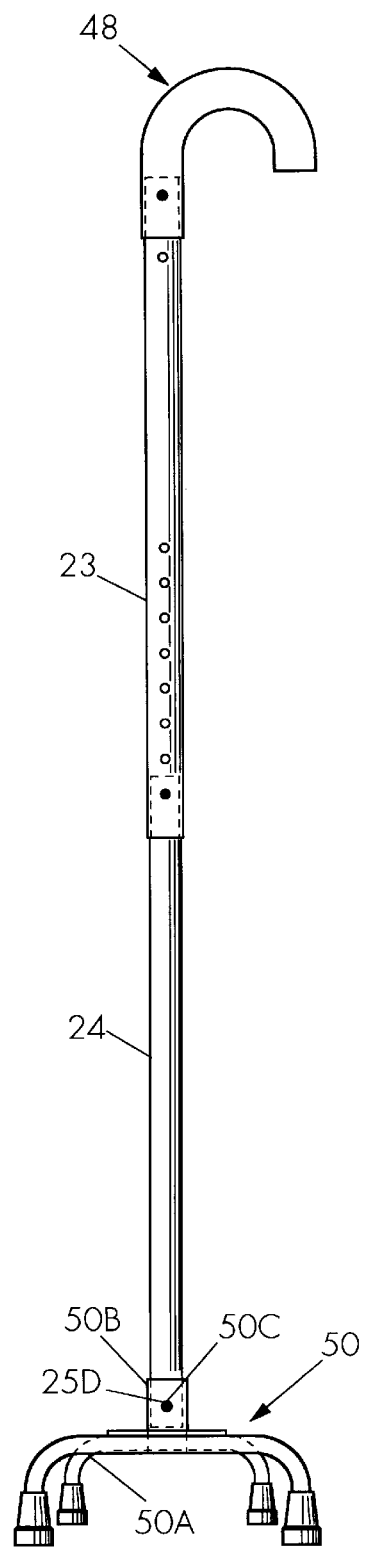
FIG. 8 is an elevational side view of a cane with an embodiment of a quad cane end tip attachment.

Description and Operation—FIGS. 6, 7, 8

Referring now to FIG. 6 there is shown a forearm crutch attachment 46 made of a rigid material. This piece fits over the top of the middle shaft tube 23 upon removal of the upper shaft tube 22. This piece is comprised of a U-shaped forearm support 46A attached to a handle 46B by a length of rigid material. Release pin hole 46D located on the collar 46C mates with middle release pin 25B to secure the attachment to the converted two segment shaft Referring now to FIG. 7 there is shown an embodiment of a cane handle assembly 48 comprising a handle 48A and a collar 48B which fits over the top end of the middle shaft tube 23. Release pin hole 48C located on collar 48B mates with middle release pin 25B atop the two segment shaft.

Referring now to FIG. 8 there is shown an embodiment of a cane with quad tip assembly 50 comprising a quad tip support 50A which engages the ground and is topped by a collar 50B. Release pin hole 50C located on collar SOB mates with lower bottom release pin 25D at the bottom end of lower shaft tube 24.

Description and Operation—FIGS. 9, 10A, 10B, 11, 12, 13

Referring to FIG. 9 there is shown a hiking staff assembly 52 comprising a staff head 52A. A tubular hand grip/collar 52C with pin holes 52D resides beneath the head. From between the head and the grip/collar hangs a hand strap 52B. Pin holes 52D mate with upper release pin 25A securing the hiking staff assembly to the top of the shaft 20.

Referring now to FIG. 10A we see a partial side view of the extended hiking staff with a snow tip attachment 54 capping the bottom end of lower shaft tube 24. The snow tip attachment 54 is held in place by lower bottom release pin 25D.

Referring now to FIG. 10B there is shown a perspective view of snow tip assembly 54 which includes a snow end tip 54A which leads upward to a snow tip limiter 54B. A collar 54C containing pin hole 54D rests on snow tip limiter 54B.

Referring now to FIG. 11 there is shown an embodiment of a pick attachment assembly 55 as it relates to the fully compacted shaft 20. Two pick tips 55A reside on the lateral extremities of the pick attachment 55, which lead to a collar 55B containing pin hole 55C. Pin hole 55C mates with upper release pin 25A securing the attachment to the shaft 20.

Referring now to FIG. 12 there is shown an embodiment of an ax-hammer attachment assembly 56 as it relates to the fully compacted shaft 20. An ax edge 56A resides on one side while a hammer end 56B resides on the opposite side. Both sides meet at a collar 56C containing pin hole 56D which mates with upper release pin 25A securing the attachment to the shaft 20.

Referring now to FIG. 13 there is shown an embodiment of a shovel attachment assembly 57 as it relates to the fully compacted shaft 20. A shovel blade 57A leads to a collar 57B containing pin hole 57C. Pin hole 57C mates with upper release pin 25A securing the attachment to the shaft 20.

Description and Operation—FIGS. 14A, 14B, 15A, 15B

Figure 14A:
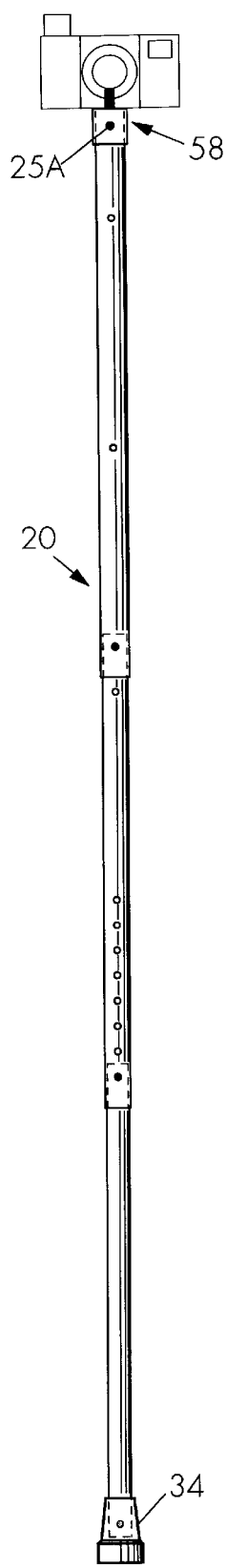
FIG. 14A is an elevational view of an embodiment of a unipod attachment (shown with camera), as it relates to the fully extended shaft.
Figure 14B:
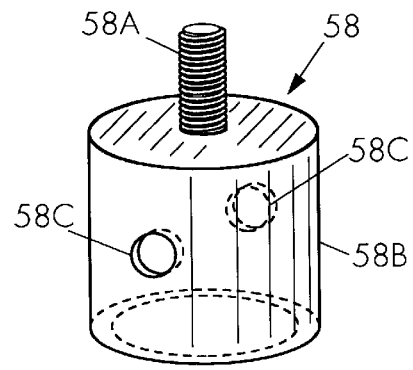
FIG. 14B is a perspective view of an embodiment of the unipod attachment.

Referring now to FIG. 14A we see a unipod attachment 58 (shown with camera) as it is attached to fully extended shaft 20 by release pin 25A Referring now to FIG. 14B there is shown a perspective view of a unipod attachment 58. A unipod screw 58A extends upward from collar 58B of which pin hole 58C is a part Referring now to FIG. 15A we see a screw tip attachment 59 (shown with broom) as it is attached to fully extended shaft 20 by release pin 25D.

Figure 15B:
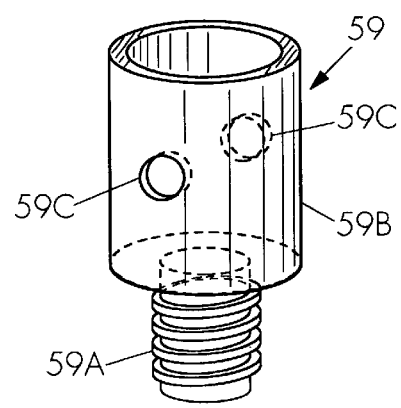
FIG. 15B is a perspective view of an embodiment of the multipurpose screw tip attachment.
Figure 15A:
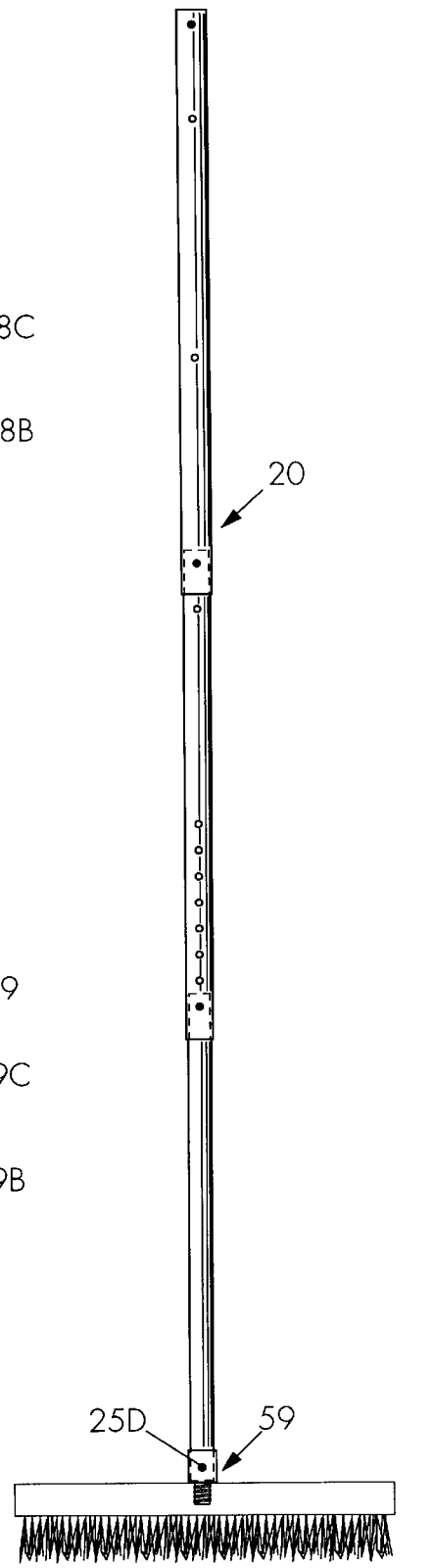
FIG. 15A is an elevational view of an embodiment of a multipurpose screw tip attachment (shown with broom), as it relates to the fully extended shaft.

Referring now to FIG. 15B there is shown a perspective view of a multipurpose screw tip attachment 59 comprising a screw tip 59A and a collar 59B containing release pin hole 59C.

Description and Operation—FIGS. 16A, 16B, 16C, 16D

Referring now to FIG. 16A we see an elevational view of a two section pole embodiment (shown with sliding doors) as it acts as a door blocking security device.

Referring now to FIG. 16B there is shown a two section pole embodiment comprising middle shaft tube 23 and lower shaft tube 24 capped on either end by end tip 34 and middle tube abutment tip 34M respectively.

Referring now to FIG. 16C there is shown an extended three section pole embodiment comprising shaft 20 capped on either end by end tip 34 and upper tube abutment tip 34U respectively.

Referring now to FIG. 16D there is shown a compacted pole or baton embodiment comprising compacted shaft 20 capped on either end by end tip 34 and upper tube abutment tip 34U respectively.

SUMMARY, RAMIFICATIONS, AND SCOPE

Accordingly, the reader will see that this invention provides a reliable, versatile, stowable, yet economical walking aid which, through the use of push button release pins and interchangeable attachments, can easily be transformed to perform any number of functions. Furthermore, this crutch has additional advantages over relevant prior art in that it accommodates people of a greater range of height;

it compacts to about one-third of its extended length for quick and easy stowing;

it can be a crutch, forearm crutch, cane or quad tip cane to aid walking in various stages of rehabilitation;

it has many uses, allowing it to be utilized even when a walking aid is not necessary;

it is easier and less expensive to produce than previous crutches, requiring less machining in manufacture while requiring a minimum of hardware;

it can be assembled quickly and easily, requiring no tools; and it is lighter and smaller allowing more economical shipping, storage, and retail display.

While the above description contains many specificities, these should not be construed as limitations on the scope of the invention, but rather as an exemplification of one preferred embodiment thereof. Many other variations are possible. For example, the cane handle may take a variety of forms as cane handles do.

The nature of this invention allows it great versatility with innumerable uses ranging far beyond the limitations of any existing crutch. Through the utilization of low-cost, snap-on attachments, possible embodiments include but are not limited to; a hiking staff, a camping shovel, an ax-hammer, a unipod, a security door stop, an all-purpose extension pole, etc., with innumerable possibilities.

Accordingly, the scope of the invention should be determined not by the embodiments illustrated, but by the appended claims and their legal equivalents.

I claim:

1. A collapsible, adjustable multi-purpose crutch comprising:

a shaft comprising at least two tubular members, the diameter of one of the members being larger than the diameter of the other of the members, each member having a top and a bottom end;

the tubular members telescoping within one another, the top end of the one member being received within the bottom end of the other member, each of the tubular members having a plurality of apertures therein, at least two of said apertures being first apertures located in the top ends of the members, at least two of said apertures being second apertures located in the bottom ends of the members, a plurality of release pin assemblies, the assemblies being received in the apertures of the tubular members interconnecting the members to form the shaft, the shaft having an extended length when the members are interconnected with the first apertures of the other member adjacent the second apertures of the one member, the shaft being able to compact to less than half the extended length of the shaft, the members being disassembled by releasing the pins from the apertures in the members, and removing the other member from within the one member, the shaft being capable of receiving a plurality of attachments there along, a support releasably attached to the top end of the one member by one of the pin assemblies received within the first aperture of the one member, the support having apertures therein receiving the assemblies, a crutch handle attached to one of the members including a hand-operated release device which extends substantially perpendicularly from the upper member, and a tip releasibly attached to the bottom end of the other member by one of the pin assemblies received within the second aperture of the other member, the tip having apertures therein receiving the assemblies.

2. The crutch as claimed in claim 1, wherein the apertures each have a diameter, and the pin assemblies each comprise a spring-loaded push-button connector having a body portion, a limit flange having a diameter larger than the diameter of the aperture receiving the assembly, and an outward urging spring member within and protruding through the apertures in the members when the members are interconnected via the assemblies.

3. The crutch as claimed in claim 1, wherein the one member contains apertures spaced between and from the first and second apertures in the one member such that the length of the shaft may be varied.

4. The crutch as claimed in claim 1, wherein the crutch comprises an upper member receiving the one member and with top and bottom ends, the support attached to the top end thereof.

5. The crutch as claimed in claim 1, wherein the support is an arm support.

6. The crutch as claimed in claim 1, wherein the support is a forearm support.

7. The crutch as claimed in claim 1, wherein the tip is a cane tip having a plurality of feet.

8. The crutch as claimed in claim 1, wherein the support is a cane handle.

9. The crutch as claimed in claim 1, wherein the crutch comprises an upper member receiving the one member and with top and bottom ends, the support attached to the top end thereof, the support being a ski pole tip having a hand strap.

10. The crutch as claimed in claim 1, wherein the support is a shovel.

11. The crutch as claimed in claim 1, wherein the support is an ax-hammer.

12. The crutch as claimed in claim 1, wherein the support is a pick.

13. The crutch as claimed in claim 1, wherein the support is a unipod attachment for receiving a camera.

14. The crutch as claimed in claim 1, wherein the tip is a ski pole tip having a plurality of flanges.

* * * * *